Jan. 13, 1942.  T. L. FAWICK  2,270,019
ROTARY REVERSING VALVE ASSEMBLY
Filed July 28, 1939

INVENTOR
Thomas L. Fawick
BY
Willard D. Eakin
ATTORNEY

Patented Jan. 13, 1942

2,270,019

UNITED STATES PATENT OFFICE 2,270,019

ROTARY REVERSING VALVE ASSEMBLY

Thomas L. Fawick, Akron, Ohio

Application July 28, 1939, Serial No. 286,999

6 Claims. (Cl. 251—8)

This invention relates to assemblies comprising a rotating part formed with one or more passages through which a fluid is conducted and a valve assembly for controlling the flow of fluid through the passage or passages. It is especially advantageous in an assembly in which the rotating part is formed with a plurality of passages requiring to be alternately charged and vented.

Its chief objects are to provide, in an assembly of this character, long effective life without repair or replacement; compactness of structure; freedom of the fluid from lubricating oil; ease of operation; accessibility of the parts; and economy of construction and repair.

Figure 1:
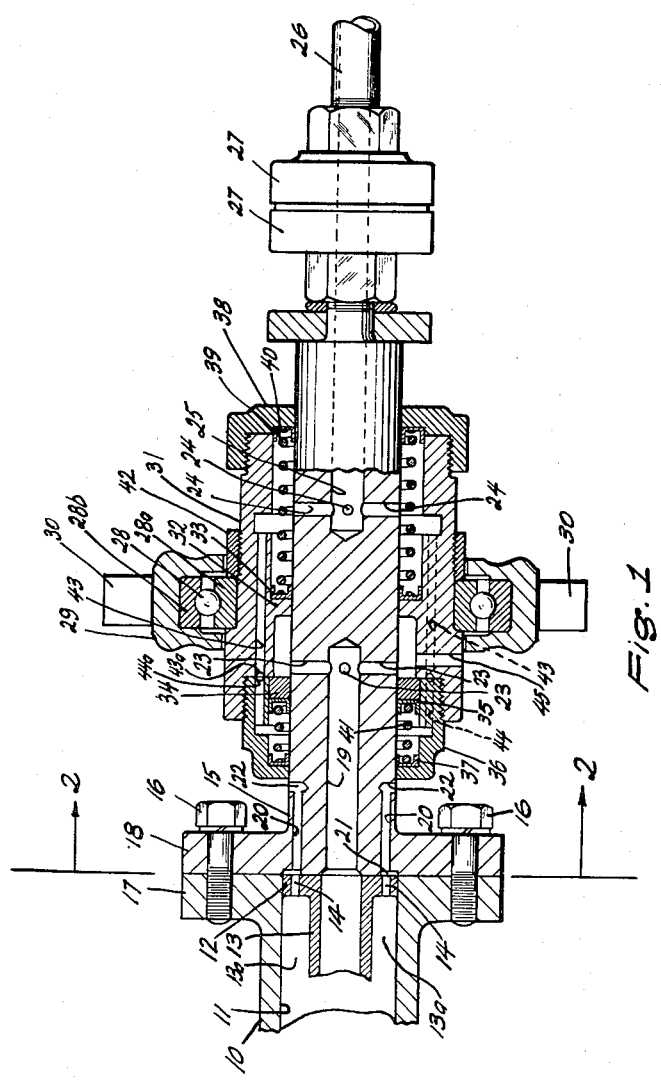
Fig. 1 is an axial section of an assembly embodying my invention in its preferred form.
Figure 2:
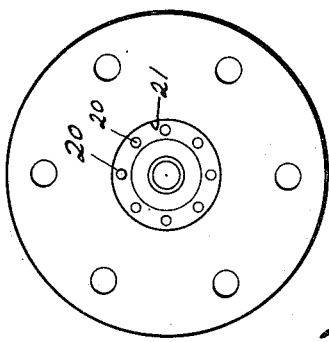
Fig. 2 is a section of the same on line 2—2 of Fig. 1.

Referring to the drawing, 10 is a rotary shaft driven from a source of power such as a gasoline motor (not shown), and permissibly through fluid actuated forward and reverse clutches (not shown) adapted to be engaged and disengaged alternately by the charging and venting device hereinafter described. The shaft 10 is formed with an axial bore 11 and with an inner annular flange 12 at one end of the bore, in which flange is mounted, as by a press-fit or welding, a fluid conducting pipe 13. The flange 12 is formed with holes 14, 14 opening at one end upon the end face of the shaft and at their other ends communicating with the annular space 13ª between the inner pipe 13 and the wall of the bore 11 of the pipe 10.

The assembly is adapted for concurrently charging the said annular space and venting the inner pipe and, alternatively, charging the inner pipe and venting the said annular shpace.

For this purpose the assembly comprises a cylindrical slide-valve core 15 coaxially secured to the end of the shaft 10 by cap-screws 16, 16 mounted in end-flanges 17, 18 formed upon the shaft 10 and the slide-valve core 15 respectively. The said core is formed with an axial bore 19 which is in sealed communication with the inner pipe 13 and with a circumferential series of bores 20, 20 connected at the end of the core by an annular channel 21 which is in sealed communication with the holes 14 in the flange 12 and, through them, with the annular space 13ª between the inner pipe 13 and the hollow shaft 10.

Through short transverse bores 22, 22 the bores 20 are open to the outer face of the cylindrical slide-valve core 15, at a position not far from the end of the core member, for venting the annular space 13ª, and at a farther position the axial bore 19 of the core communicates with the outer face of the core through transverse bores 23, 23, for venting the inner pipe 13.

At a position near its other end the core member 15 is formed with a series of radial bores 24, 24 extending from its outer face to an axial bore 25 which is held in sealed communication with a non-rotating fluid-supply pipe 26 by means of a rotary seal 27, where may be of any standard or suitable construction.

For putting the bore 24 in communication with the bores 23 while venting the bores 22, and with the bores 22 while venting the bores 23, and for shutting of the flow from the bores 24 while venting the bores 22 and the bore 23, a slide-valve assembly is mounted upon the slide-valve core 15 and is journaled, by means of a ball-bearing 28, in a shifting collar 29 having studs 30, 30 for the engagement of any known or suitable shifting means.

This slide-valve assembly, thus adapted to rotate with its core 15 and the shaft 10, comprises a casing 31 formed with an internal annular flange 32 which slidably fits the outer surface of the core member 15. Seated against one side of the flange 32 is a U-section sealing ring 33 and seated against a metal ring 34 which abuts a shoulder formed within the casing 31 is another U-section sealing ring 35. Screwed into one end of the casing 31 is an annular end-cap 36 which provides a seat for a U-section sealing ring 37 and screwed onto the other end of the casing 31 is an annular end-cap 38 which provides a seat for a U-section sealing ring 39. The sealing rings 33 and 39 are held against their seats by a helical compression spring 40 interposed between them and the sealing rings 35 and 37 are likewise held against their seats by a helical compression spring 41 interposed between them.

The ball bearing 28 above referred to has its inner race 28ª held against a shoulder on the casing 31 by a nut 42 and its outer race 28ᵇ is set in the shifting collar 29.

The space between the sealing rings 33 and 39 is in constant communication with the space between the sealing rings 35 and 37, through a circumferential series of bores 43, 43 in the casing 31, a circumferential series of bores 44, 44 in the end-cap 36, and annular distributing grooves 43ª, 44ª formed in the casing 31 and the end-cap 36 respectively.

The casing assembly is shown in Fig. 1 as being in neutral position, with the annular space 13ᵃ vented through the passages 20 and 22, the inner pipe 13 vented through the passages 19, 23 and a passage 45 formed in the casing 31, and flow of fluid from the supply-pipe 26 shut off by the sealing rings 35 and 37 bridging an imperforate annular zone of the core's surface.

The spacing of the several sealing rings is such that when the casing assembly is shifted a suitable distance to the right the space within the end-cap 36 is brought into communication with the bores 23, the passages 22 then being open to the atmosphere, and when the casing assembly is shifted a suitable distance to the left the said space is brought into communication with the bores 22 and the bores 23 are then open to the vent passage 45.

The casing assembly rotates with the shaft 10 and core 15, and so freely, by reason of the ball-bearing 28, that the only movement of the sealing rings upon the core is lengthwise of the latter, and is only the movement incident to the opening and closing of the valve ports, and the several advantages contemplated in the above statement of objects are well provided.

I claim:

1. A valve assembly comprising a core mounted for rotation and formed with at least three fluid passages each opening upon its radially outer surface, a valve casing mounted on said core to rotate therewith but slidable axially thereon, said casing being formed with a passage of such proportions as to be in communication with one of the core's passages when the casing is shifted to bring its passages into communication with the other two core passages selectively, and means for so shifting the casing during its rotation.

2. A valve assembly comprising a core adapted for rotation and formed with at least three fluid passages each opening upon its radially outer surface, a valve casing mounted on said core to rotate therewith but slidable axially thereon, said casing being formed with a passage of such proportions as to be in communication with one of the core's passages when the casing is shifted to bring its passage into communication with the other two core passages selectively, and means for so shifting the casing during its rotation, the casing and core being so proportioned as to vent one and charge the other of the said other two passages at each limit of their relative sliding movement.

3. A valve assembly comprising a core adapted for rotation and formed with at least three fluid passages each opening upon its radially outer surface, a valve casing mounted on said core to rotate therewith but slidable axially thereon, said casing being formed with a passage of such proportions as to be in communication with one of the core's passages when the casing is shifted to bring its passage into communication with the other two core passages selectively, and means for so shifting the casing during its rotation, the casing and core being so proportioned as to vent one and charge the other of the said other two passages at each limit of their relative sliding movement, and to vent both and shut off the other passage at an intermediate position.

4. A valve assembly comprising a core adapted for rotation and formed with at least three fluid passages each opening upon its radially outer surface, a valve casing mounted on said core to rotate therewith but slidable axially thereon, said casing being formed with a supply passage of such proportions as to be in communication with one of the core's passages when the casing is shifted to bring its passage into communication with the other two core passages selectively and the casing being formed also with a vent passage so shaped and proportioned as to be brought into and out of communication with one of the said other two core passages.

5. A valve assembly comprising a core mounted for rotation and formed with a fluid passage opening upon its radially outer surface, valve means mounted upon the exterior of and rotatable with said core but slidable axially thereon during their rotation for opening and closing said passage without relative rotary movement, and valve-shifter means, mounted for substantially axial movement only, for axially sliding the valve means on the core during their rotation.

6. A valve assembly comprising a core mounted for rotation and formed with at least two fluid passages in series opening upon its radially outer surface, a valve casing mounted upon the exterior of and rotatable with said core but slidable axially thereon during their rotation and so formed with a fluid passage as to adapt it to make and break closed fluid connection between the two said passages of the core by being slid axially on the core during their rotation, without relative rotary movement, and valve-shifter means, mounted for substantially axial movement only, for axially sliding the valve casing on the core during their rotation.

THOMAS L. FAWICK.